(12) United States Patent
Liu

(10) Patent No.: US 7,442,144 B2
(45) Date of Patent: Oct. 28, 2008

(54) SLIDE-PROOF STRUCTURE BETWEEN AN OUTER WALL OF PLANET GEAR AND PLANET FRAME OF DIFFERENTIAL MECHANISM

(76) Inventor: Jen-Chih Liu, 235 Chung-Ho, Box 8-24, Taipei (TW)

( * ) Notice: Subject to any disclaimer, the term of this patent is extended or adjusted under 35 U.S.C. 154(b) by 258 days.

(21) Appl. No.: 11/385,606

(22) Filed: Mar. 22, 2006

(65) Prior Publication Data
US 2007/0225110 A1    Sep. 27, 2007

(51) Int. Cl.
*F16H 48/06* (2006.01)
(52) U.S. Cl. ..................................... 475/233
(58) Field of Classification Search ................ 475/233, 475/251, 249
See application file for complete search history.

(56) References Cited
U.S. PATENT DOCUMENTS

| | | | | |
|---|---|---|---|---|
| 2,354,214 | A * | 7/1944 | Lockwood | 475/233 |
| 3,724,289 | A * | 4/1973 | Kennicutt | 475/88 |
| 5,472,385 | A * | 12/1995 | Vu | 475/251 |
| 5,897,452 | A * | 4/1999 | Schreier et al. | 475/230 |
| 6,015,362 | A * | 1/2000 | Irikura et al. | 475/231 |

* cited by examiner

*Primary Examiner*—Dirk Wright

(57) ABSTRACT

A slide-proof structure between an outer wall of a planet gear and a planet frame of a differential mechanism comprises a left half shaft engaged to a left gear; a right half shaft engaged to a right gear; at least one planet gear installed between the left gear and the right gear; a planet frame installed at outer sides of the left half shaft and the right half shaft; the planet frame being formed by two pieces which includes a left sub-frame and a right sub-frame; and a slide proof device installed at an upper outer wall or a lower outer wall of the planet gear and located between the left sub-frame and the right sub-frame of the planet frame. Furthermore, an elastic body is installed at an outer side of the slide proof device; and the elastic body resisting against the slide proof device.

16 Claims, 5 Drawing Sheets

SLIDE-PROOF STRUCTURE BETWEEN AN OUTER WALL OF PLANET GEAR AND PLANET FRAME OF DIFFERENTIAL MECHANISM

FIELD OF THE INVENTION

The present invention relates to slide-proof structures, and in particular to a slide-proof structure between an outer wall of a planet gear and a planet frame of a differential mechanism, wherein a slide proof device is installed at an upper outer wall or a lower outer wall of the planet gear and located between the left sub-frame and the right sub-frame of the planet frame.

BACKGROUND OF THE INVENTION

In the prior art, the slide-proof structure is installed between an outer wall of a half shaft gear and a planet frame of a differential mechanism. The left gear, right gear, and planet gear may be umbrella form gears or surface gears.

In U.S. Pat. No. 5,472,385, a slide-proof structure is disclosed. The slide-proof structure is installed between a half shaft gear and a planet frame of a differential mechanism, that is at a backside of a half shaft gear and a wall of a planet frame facing to the backside of a half shaft gear. Thus, the slide-proof structure has a larger volume and the cost is high. For a longer time, the frictions between the left gear, the right gear and the slide-proof sheet become great so as to affect the efficiency of the differential mechanism.

SUMMARY OF THE INVENTION

Accordingly, the primary object of the present invention is to provide a slide-proof structure between an outer wall of a planet gear and a planet frame of a differential mechanism, wherein a slide proof device is installed at an upper outer wall or a lower outer wall of the planet gear and located between the left sub-frame and the right sub-frame of the planet frame.

To achieve above objects, the present invention provides a slide-proof structure between an outer wall of a planet gear and a planet frame of a differential mechanism which comprises a left half shaft engaged to a left gear; a right half shaft engaged to a right gear; at least one planet gear installed between the left gear and the right gear; a planet frame installed at outer sides of the left half shaft and the right half shaft; the planet frame being formed by two pieces which includes a left sub-frame and a right sub-frame; and a slide proof device installed at an upper outer wall or a lower outer wall of the planet gear and located between the left sub-frame and the right sub-frame of the planet frame. Furthermore, an elastic body is installed at an outer side of the slide proof device; the elastic body resisting against the slide proof device.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
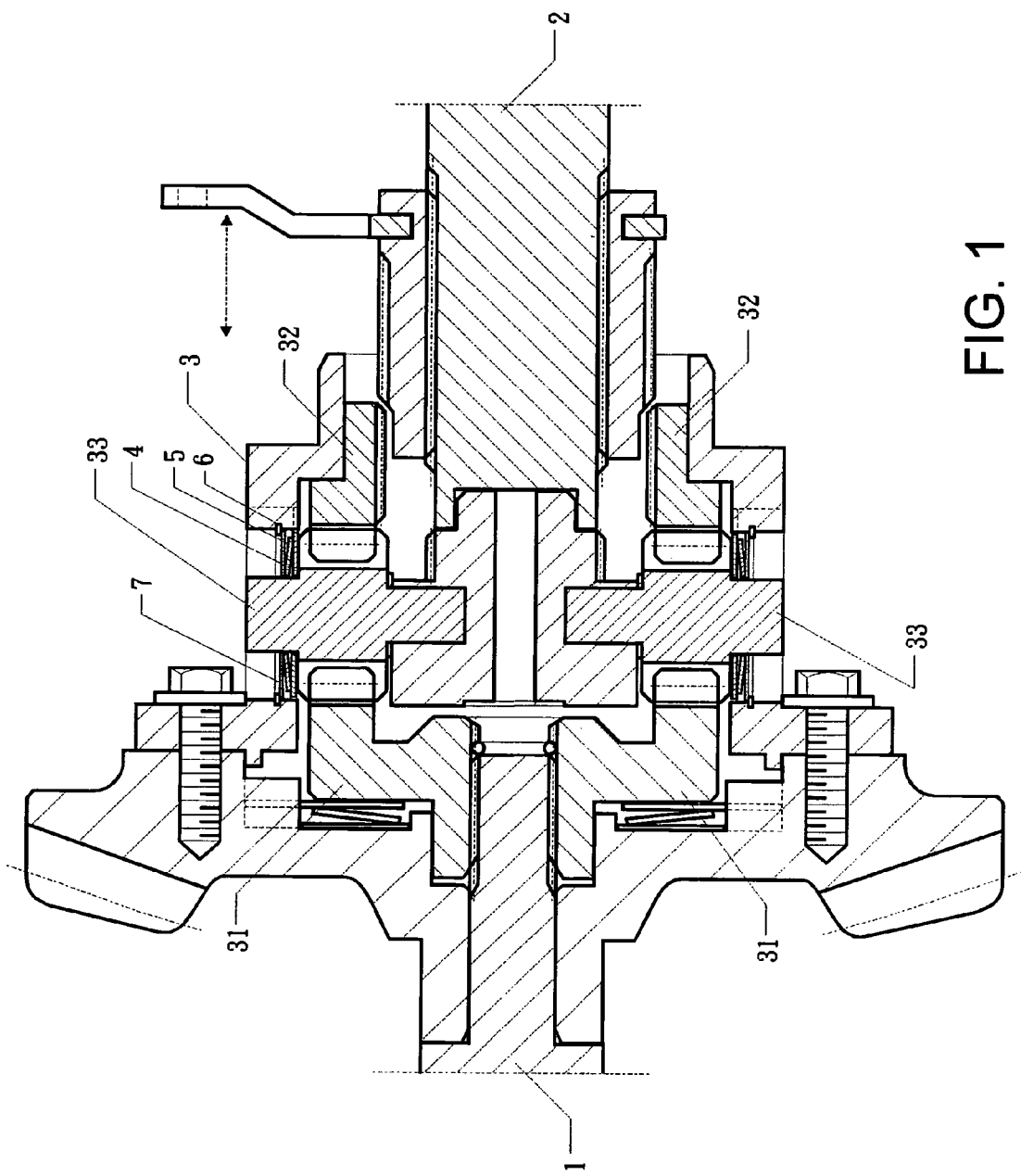
FIG. 1 shows the first embodiment of the present invention.
Figure 2:
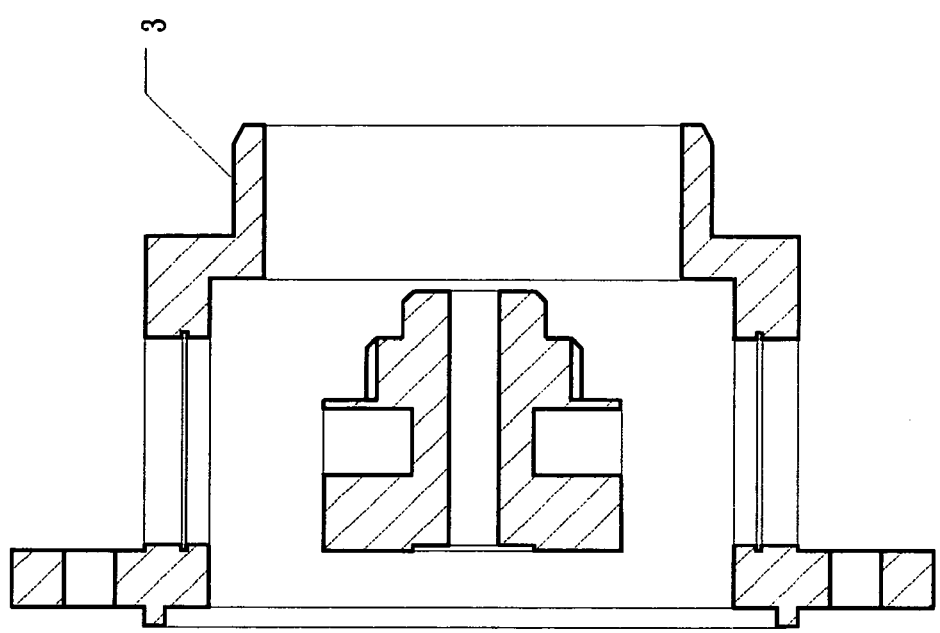
FIG. 2 shows the schematic view about the planet frame of the embodiment in FIG. 1.
Figure 3:
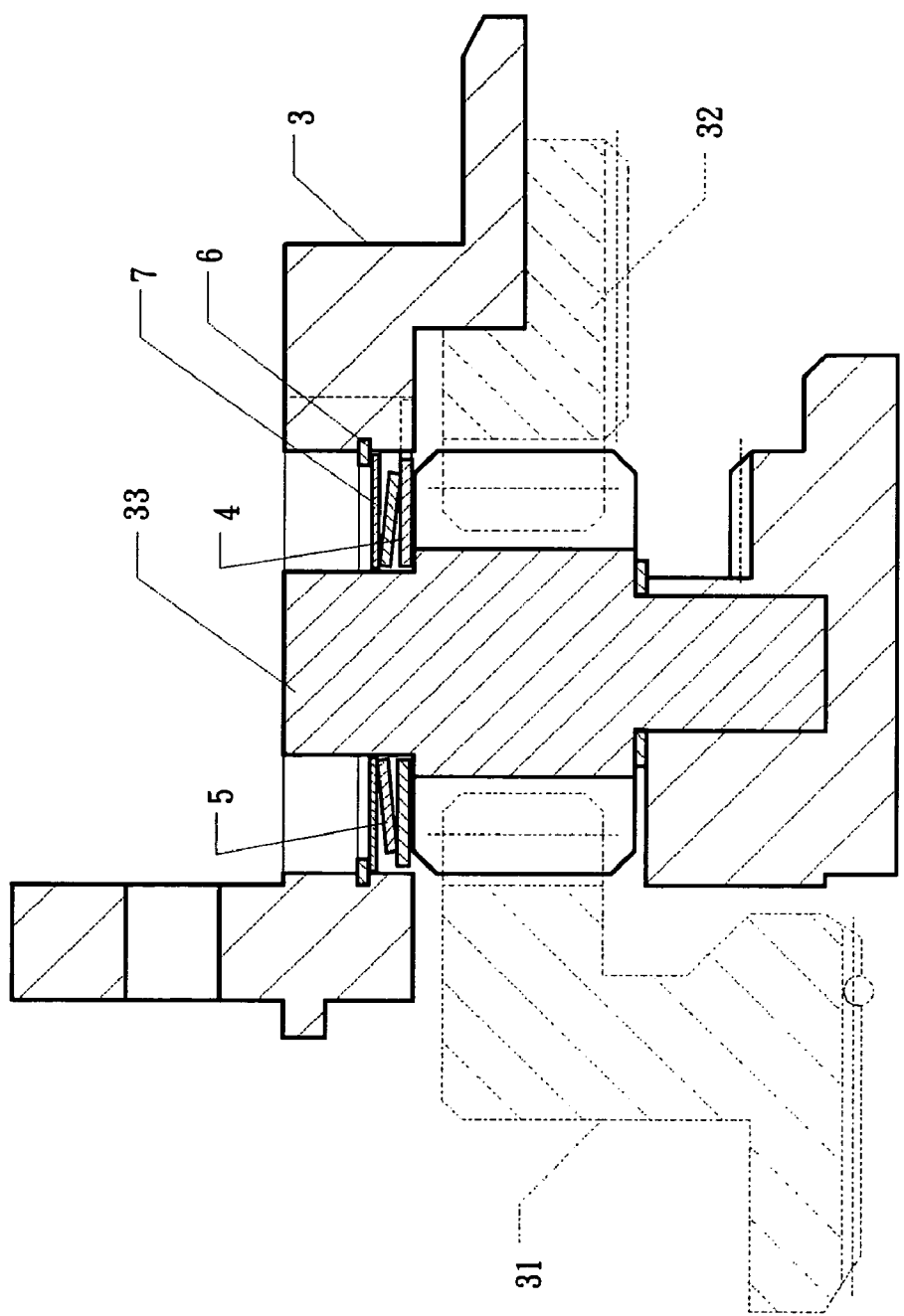
FIG. 3 is an enlarged view of the embodiment in FIG. 1.

Referring to FIGS. 1, 2 and 3, the structure of the present invention is illustrated. The present invention is related to a planar gear form (or a surface gear form, face gear form) differential mechanism. The first embodiment of the present invention has the following elements.

A left half shaft 1 is engaged to a left gear 31.

A right half shaft 2 is engaged to a right gear 32. In the present invention, the left gear is a left planar gear (or left surface gear or left face gear) and the right gear is a right planar gear (or right surface gear or right face gear).

At least one planet gear 33 is installed between the left gear 31 and the right gear 32.

A planet frame 3 is installed at outer sides of the left half shaft 1 and the right half shaft 2. The planet frame 3 is formed by two pieces, a left sub-frame and a right sub-frame.

A slide proof device 4 is installed at an upper outer wall of the planet gear 33 and is located between the left sub-frame and the right sub-frame of the planet frame 3. The slide proof device may be a slide proof sheet.

An elastic body 5 is installed at an outer side of the slide proof device 4. The elastic body 5 may be a spiral spring. The elastic body 5 resists against the slide proof device 4.

A limiting element 6 (such as a C ring 6) serves to confine the elastic body 5.

A washer 7 is placed between the limiting element 6 and the elastic body 5 so that the elastic body 5 gives a pressure to the slide proof device 4.

Thereby the slide-proof structure between an outer wall of a planet gear and a planet frame of a differential mechanism is formed by above mentioned components.

Figure 4:
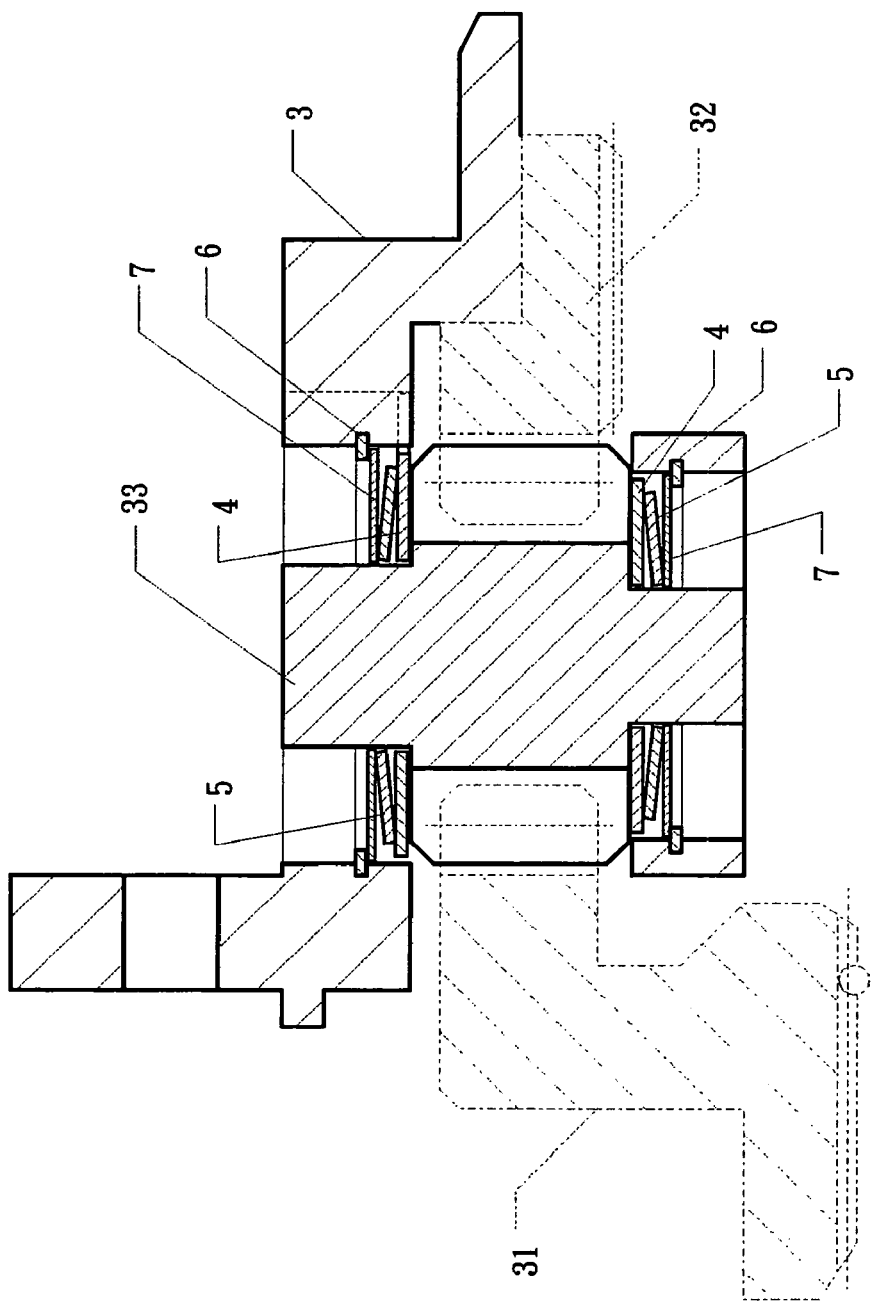
FIG. 4 shows the second embodiment of the present invention.

Referring to FIG. 4, the second embodiment of the present invention is illustrated.

A left half shaft 1 is engaged to a left gear 31.

A right half shaft 2 is engaged to a right gear 32.

At least one planet gear 33 is installed between the left gear 31 and the right gear 32.

A planet frame 3 is installed at outer sides of the left half shaft 1 and the right half shaft 2. The planet frame 3 is formed by two pieces, a left sub-frame and a right sub-frame.

Two slide proof devices 4 are installed at an upper outer wall and a lower outer wall of the planet gear 33 and are located between the left sub-frame and the right sub-frame of the planet frame 3. The slide proof device may be a slide proof sheet.

Two elastic bodies 5 are installed at outer sides of the slide proof devices 4, respectively. The elastic bodies 5 may be a spiral spring. The elastic bodies 5 resist against the slide proof devices 4.

Two limiting elements 6 (such as a C ring 6) serve to confine the elastic bodies 5.

Two washers 7 are placed between the limiting elements 6 and the elastic bodies 5, respectively so that the elastic bodies 5 give pressures to the slide proof devices 4.

Thereby the slide proof structure between the outer wall of a planet gear and a planet frame for a differential mechanism are for formed.

Figure 5:
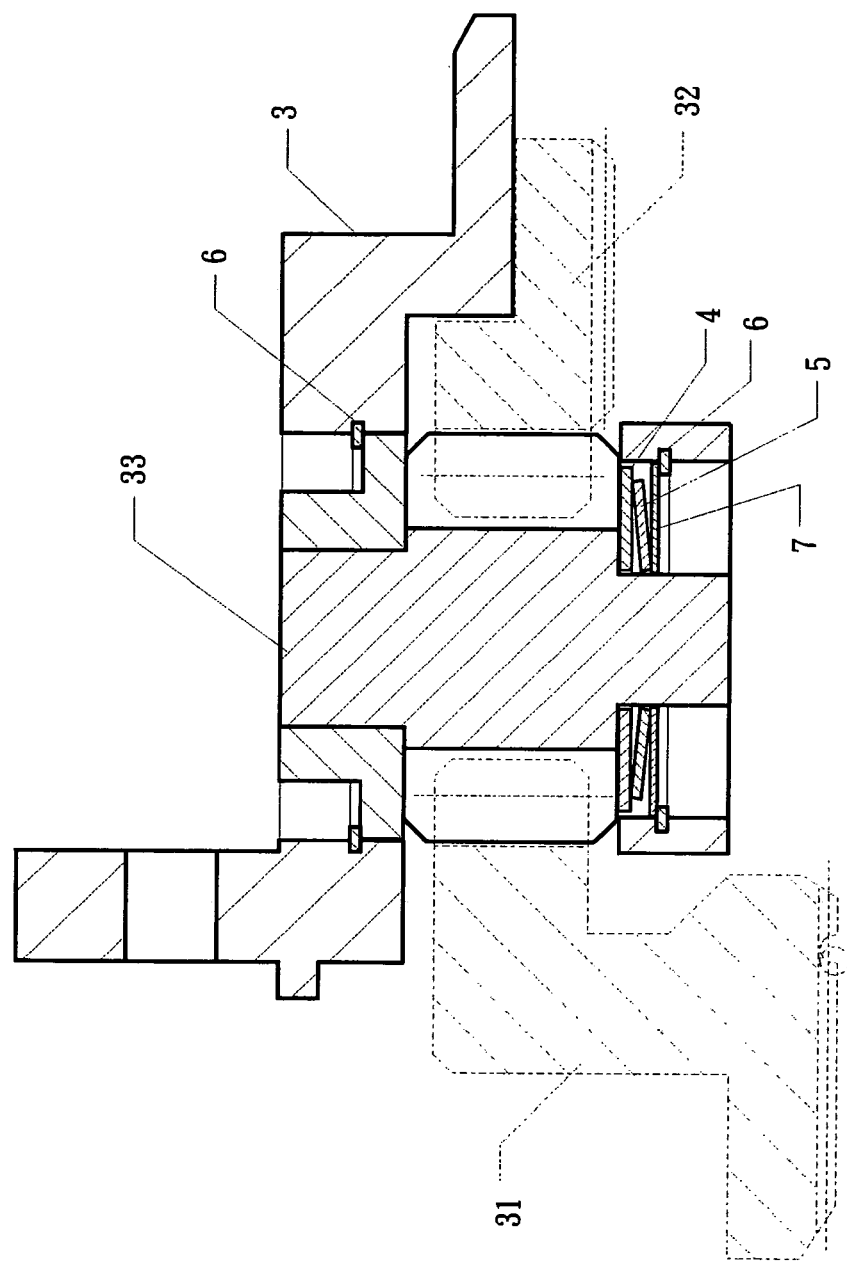
FIG. 5 shows the third embodiment of the present invention.

Referring to FIG. 5, the third embodiment of the present invention is illustrated. The present invention has the following elements.

A left half shaft 1 is engaged to a left gear 31.

A right half shaft 2 is engaged to a right gear 32.

At least one planet gear 33 is installed between the left gear 31 and the right gear 32.

A planet frame 3 is installed at outer sides of the left half shaft 1 and the right half shaft 2. The planet frame 3 is formed by two pieces, a left sub-frame and a right sub-frame.

A slide proof device 4 is installed at a lower outer wall of the planet gear 33 and is located between the left sub-frame and the right sub-frame of the planet frame 3. The slide proof device may be a slide proof sheet.

An elastic body 5 is installed at an outer side of the slide proof device 4. The elastic body 5 may be a spiral spring. The elastic body 5 resists against the slide proof device 4.

A limiting element 6 (such as a C ring 6) serves to confine the elastic body 5.

A washer 7 is placed between the C ring 6 and the elastic body 5 so that the elastic body 5 gives a pressure to the slide proof device 4.

It should be noted in all above mentioned embodiment, the left gear is a left planar gear (or left surface gear or left face gear) and the right gear is a right planar gear (or right surface gear or right face gear).

Thereby the slide proof structure between the outer wall of a planet gear and a planet frame for a differential mechanism is thus formed by above mentioned structure.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A slide-proof structure between an outer wall of a planet gear and a planet frame of a differential mechanism comprising:
    a left half shaft engaged to a left gear;
    a right half shaft engaged to a right gear;
    at least one planet gear installed between the left gear and the right gear;
    a planet frame installed at outer sides of the left half shaft and the right half shaft; the planet frame being formed by two pieces which includes a left sub-frame and a right sub-frame;
    a slide proof device installed at an upper outer wall of the planet gear and located between the left sub-frame and the right sub-frame of the planet frame; and
    an elastic body installed at an outer side of the slide proof device; the elastic body resisting against the slide proof device;
    a limiting element for confining the elastic body; and
    a washer placed between the limiting element and the elastic body so that the elastic body give a pressure to the slide proof device.

2. The slide-proof structure between an outer wall of a planet gear and a planet frame of a differential mechanism as claimed in claim 1, wherein the slide proof device is a slide proof sheet.

3. The slide-proof structure between an outer wall of a planet gear and a planet frame of a differential mechanism as claimed in claim 1, wherein the elastic body is a spiral spring.

4. The slide-proof structure between an outer wall of a planet gear and a planet frame of a differential mechanism as claimed in claim 1, wherein the limiting element is a C ring.

5. A slide-proof structure between an outer wall of a planet gear and a planet frame of a differential mechanism comprising:
    a left half shaft engaged to a left gear;
    a right half shaft engaged to a right gear;
    at least one planet gear installed between the left gear and the right gear;
    a planet frame installed at outer sides of the left half shaft and the right half shaft; the planet frame being formed by two pieces which includes a left sub-frame and a right sub-frame; and
    two slide proof devices installed at an upper outer wall and a lower outer wall of the planet gear and located between the left sub-frame and the right sub-frame of the planet frame.

6. The slide-proof structure between an outer wall of a planet gear and a planet frame of a differential mechanism as claimed in claim 5, further comprising:
    two elastic bodies installed at outer sides of the slide proof devices, respectively; the elastic bodies resisting against the slide proof devices;
    two limiting elements for confining the elastic bodies; and
    two washers placed between the limiting elements and the elastic bodies, respectively so that the elastic bodies give pressures to the slide proof devices.

7. The slide-proof structure between an outer wall of a planet gear and a planet frame of a differential mechanism as claimed in claim 5, wherein each slide proof device is a slide proof sheet.

8. The slide-proof structure between an outer wall of a planet gear and a planet frame of a differential mechanism as claimed in claim 5, wherein each elastic body is a spiral spring.

9. The slide-proof structure between an outer wall of a planet gear and a planet frame of a differential mechanism as claimed in claim 5, wherein each limiting element is a C ring.

10. The slide-proof structure between an outer wall of a planet gear and a planet frame of a differential mechanism as claimed in claim 1, wherein the left gear is a left planar gear and the right gear is a right planar gear.

11. A slide-proof structure between an outer wall of a planet gear and a planet frame of a differential mechanism comprising:
    a left half shaft engaged to a left gear;
    a right half shaft engaged to a right gear;
    at least one planet gear installed between the left gear and the right gear;
    a planet frame installed at outer sides of the left half shaft and the right half shaft; the planet frame being formed by two pieces which includes a left sub-frame and a right sub-frame; and
    a slide proof device installed at a lower outer wall of the planet gear and located between the left sub-frame and the right sub-frame of the planet frame.

12. The slide-proof structure between an outer wall of a planet gear and a planet frame of a differential mechanism as claimed in claim 11, further comprising:
    an elastic body installed at an outer side of the slide proof device; the elastic body resisting against the slide proof device;
    a limiting element for confining the elastic body; and
    a washer placed between the limiting element and the elastic body so that the elastic body give a pressure to the slide proof device.

13. The slide-proof structure between an outer wall of a planet gear and a planet frame of a differential mechanism as claimed in claim 11, wherein the slide proof device is a slide proof sheet.

14. The slide-proof structure between an outer wall of a planet gear and a planet frame of a differential mechanism as claimed in claim 11, wherein the elastic body is a spiral spring.

15. The slide-proof structure between an outer wall of a planet gear and a planet frame of a differential mechanism as claimed in claim 11, wherein the limiting element is a C ring.

16. The slide-proof structure between an outer wall of a planet gear and a planet frame of a differential mechanism as claimed in claim 11, wherein the left gear is a left planar gear and the right gear is a right planar gear.

\* \* \* \* \*